United States Patent
Liu et al.

(10) Patent No.: US 8,467,297 B2
(45) Date of Patent: Jun. 18, 2013

(54) HYBRID MESH ROUTING PROTOCOL

(75) Inventors: Hang Liu, Yardley, PA (US); Jun Li, Plainsboro, NJ (US); Saurabh Mathur, Plainsboro, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 866 days.

(21) Appl. No.: 11/885,838

(22) PCT Filed: Mar. 10, 2005

(86) PCT No.: PCT/US2005/008210
§ 371 (c)(1),
(2), (4) Date: Sep. 7, 2007

(87) PCT Pub. No.: WO2006/098723
PCT Pub. Date: Sep. 21, 2006

(65) Prior Publication Data
US 2008/0170550 A1 Jul. 17, 2008

(51) Int. Cl.
*H04L 12/28* (2006.01)
*H04H 20/71* (2008.01)
*H04W 4/00* (2009.01)
*G06F 15/173* (2006.01)

(52) U.S. Cl.
USPC ........... 370/238; 370/254; 370/312; 370/338; 709/241

(58) Field of Classification Search
USPC ......... 370/338, 389, 390, 392, 254, 235–238, 370/312, 328, 351–352; 455/41.2, 456.1, 455/445; 709/203, 227–228, 230–244
See application file for complete search history.

(56) References Cited

U.S. PATENT DOCUMENTS

| | | | |
|---|---|---|---|
| 5,987,011 A | 11/1999 | Toh | |
| 6,026,073 A | 2/2000 | Brown et al. | |
| 6,418,138 B1 | 7/2002 | Cerf et al. | |
| 6,421,731 B1 | 7/2002 | Ciotti, Jr. et al. | |
| 6,446,126 B1 | 9/2002 | Huang et al. | |
| 6,535,498 B1 | 3/2003 | Larsson et al. | |
| 6,791,949 B1 * | 9/2004 | Ryu et al. | 370/254 |

(Continued)

FOREIGN PATENT DOCUMENTS

| | | |
|---|---|---|
| CN | 1110210 | 5/2003 |
| EP | 1376939 A2 | 1/2004 |

(Continued)

OTHER PUBLICATIONS

Yasunori Owada et al., "Implementation of Link Stability-Aware AODV and Performance Evaluation", Technical Report of IEICE CQ2004-7, vol. 104 No. 21 pp. 35-39. Apr. 15, 2004.

(Continued)

*Primary Examiner* — Habte Mered
(74) *Attorney, Agent, or Firm* — Robert D. Shedd; Jeffrey M. Navon; Catherine A. Cooper

(57) ABSTRACT

A method for selecting a route by a node between a source node and a destination node in a wireless mesh network by establishing the route between the source node and the destination node using media access control addresses is described. A method for a node to selecting a route to join a multicast group in a wireless mesh network using media access control addresses, is also described.

24 Claims, 5 Drawing Sheets

U.S. PATENT DOCUMENTS

| | | | |
|---|---|---|---|
| 7,010,590 B1 | 3/2006 | Munshi | |
| 7,079,509 B2 | 7/2006 | Belcea | |
| 7,177,295 B1 | 2/2007 | Sholander et al. | |
| 7,251,238 B2 | 7/2007 | Joshi et al. | |
| 7,382,740 B2 | 6/2008 | Joshi | |
| 7,382,759 B2 | 6/2008 | Joshi | |
| 7,463,907 B2 * | 12/2008 | Smith et al. | 455/562.1 |
| 7,483,411 B2 | 1/2009 | Weinstein et al. | |
| 7,512,074 B2 * | 3/2009 | Strutt et al. | 370/238 |
| 7,522,537 B2 | 4/2009 | Joshi | |
| 7,606,187 B2 * | 10/2009 | Zeng et al. | 370/312 |
| 7,649,884 B1 * | 1/2010 | Ahmed et al. | 370/390 |
| 7,719,987 B2 | 5/2010 | Kobayashi et al. | |
| 2002/0039357 A1 | 4/2002 | Lipasti et al. | |
| 2004/0141511 A1 | 7/2004 | Rune et al. | |
| 2004/0143842 A1 | 7/2004 | Joshi | |
| 2004/0156318 A1 | 8/2004 | Rune et al. | |
| 2004/0167988 A1 | 8/2004 | Rune et al. | |
| 2004/0264372 A1 | 12/2004 | Huang | |
| 2004/0264466 A1 | 12/2004 | Huang | |
| 2005/0041591 A1 * | 2/2005 | Duggi et al. | 370/238 |
| 2005/0041627 A1 * | 2/2005 | Duggi | 370/338 |
| 2005/0041628 A1 | 2/2005 | Duggi et al. | |
| 2005/0129000 A1 | 6/2005 | Sivakumar et al. | |
| 2005/0135379 A1 * | 6/2005 | Callaway et al. | 370/395.31 |
| 2006/0007882 A1 * | 1/2006 | Zeng et al. | 370/328 |
| 2006/0098607 A1 * | 5/2006 | Zeng et al. | 370/338 |
| 2006/0098611 A1 | 5/2006 | Joshi et al. | |
| 2006/0098612 A1 | 5/2006 | Joshi et al. | |
| 2006/0114850 A1 * | 6/2006 | Avinash | 370/328 |
| 2006/0187893 A1 | 8/2006 | Joshi | |
| 2006/0268727 A1 | 11/2006 | Rangarajan et al. | |
| 2007/0070959 A1 | 3/2007 | Almeroth et al. | |
| 2007/0274268 A1 * | 11/2007 | Axelsson et al. | 370/338 |
| 2008/0002599 A1 * | 1/2008 | Yau et al. | 370/310 |
| 2008/0170550 A1 | 7/2008 | Liu et al. | |
| 2010/0061272 A1 | 3/2010 | Veillette | |

FOREIGN PATENT DOCUMENTS

| | | |
|---|---|---|
| EP | 1467524 | 10/2004 |
| JP | 2003008588 | 1/2003 |
| JP | 200360653 A | 2/2003 |
| JP | 2003509926 | 3/2003 |
| JP | 2003516031 | 5/2003 |
| JP | 200456787 A | 2/2004 |
| JP | 2004-528761 A1 | 9/2004 |
| JP | 2005033557 A | 2/2005 |
| JP | 2005064723 | 3/2005 |
| JP | 2005191659 | 7/2005 |
| JP | 2005252858 | 9/2005 |
| JP | 2005303998 | 10/2005 |
| KR | 1020020035163 A | 6/2002 |
| RU | 2004103744 | 6/2005 |
| WO | 0124385 A2 | 4/2001 |
| WO | WO0141375 | 6/2001 |
| WO | WO0171928 | 9/2001 |
| WO | WO0195641 | 12/2001 |
| WO | 02077820 A1 | 10/2002 |
| WO | WO02077820 | 10/2002 |
| WO | WO03061220 | 7/2003 |
| WO | 03077452 A1 | 9/2003 |
| WO | 2004023740 A1 | 3/2004 |
| WO | WO2004051939 | 6/2004 |
| WO | WO2004100454 | 11/2004 |

OTHER PUBLICATIONS

Asano, Junya, "Get Technology Right, Journal of Computer World," "vol. 4, Is it possible to make the telephone communication free?," Wireless P2P mobile telephone, Journal of Computer World, vol. 1 Fifth version, pp. 136-139, published by IDG Japan, Inc.

Shirasu, Motoki, et al., "A multicast Protocol Avoiding Unnecessary Data Forwarding with Source Distinction in Mobile Ad Hoc Networks," Technical Report of IEICE (The Institute of Electronics, Information and Communication Engineers) IN2004-297, vol. 104, No. 692, pp. 265-268, Feb. 25, 2005.

Johnson et al., "The Dynamic Source Routing Protocol for Mobile Ad Hoc Networks (DSR)'", The Dynamic Source Routing Protocol (DSR) for Mobile Ad, 117 pages, Jul. 19, 2004.

Perkins Et Al., "RFC3561—Ad Hoc On-Demand Distance Vector (AODV) Routing"; Network Working Group, Jul. 2003.

Perkins et al., "Ad-Hoc On-Demand Distance Vector Routing", IEEE Xplore, New Orleans, LA, Feb. 22-26, 1999, six pages.

Zhao et al., "PARMA, A PHY/MAC Aware Routing Metric for Ad-Hoc Wireless Networks with Muiti-Rate Radios", Proceedings of the Sixth IEEE International Symposium on a World of Wireless Mobile and Muitimedia Networks (WoWMoM'05), 2005.

* cited by examiner

HYBRID MESH ROUTING PROTOCOL

This application claims the benefit, under 35 U.S.C. §365 of International Application PCT/US2005/008210, filed Mar. 10, 2005, which was published in accordance with PCT Article 21(2) on Sep. 21, 2006 in English.

FIELD OF THE INVENTION

The present invention relates to a routing mechanism for automatic topology learning and path selection. In particular, the present invention relates to determining routes in a wireless local area mesh network based on media access control addresses.

BACKGROUND OF THE INVENTION

A wireless local area mesh network, also called a wireless LAN-based ad hoc network, consists of two or more nodes interconnected via radio links and communicating with each other directly or indirectly. It may connect to the Internet or other networks through a portal. In wireless local area mesh networks, the IP layer routing protocols have been used to discover the route from a source node to a destination node. The IP layer ad hoc routing protocols are based on the IP addresses. However, some devices, such as WLAN access points, forward data packets based on the IEEE 802.11 media access control (MAC) address and only operate at the link layer (Layer 2). In addition, data forwarding at Layer 2 is generally faster than that at the IP layer (Layer 3) because the data packets do not have to pass to the IP layer.

The Ad Hoc On-Demand Distance Vector (AODV) protocol is an ad hoc routing protocol that operates at the IP layer. It can support unicast and multicast route discovery. Routes are discovered on an on-demand basis. When a source wants to send a packet to a destination node, it discovers the route to the destination by broadcasting a route request message over the network if it does not have and needs a valid route to the destination node. The message contains the IP addresses of the source node and destination node along with other necessary information. The destination node or the node with a valid route to the destination node replies to this request by sending a route reply to the source node. The route request and route reply messages establish the routing table in each of intermediate nodes for forward and reverse paths/routes. The established routes expire if they are not used within a given route lifetime. The on-demand routing reduces the effects of stale routes due to network topology changes (for example, to node mobility and failures) and the need for maintaining unused routes. However, it introduces route discovery delay because the source node needs to establish the route before it is able to send the data. The source node also needs to buffer the data during the route discovery period.

The Destination-Sequenced Distance Vector (DSDV) is a proactive routing protocol for wireless local area mesh networks. The nodes in the network exchange routing control messages so that the routing table at each node contains the routing information to all the destination nodes in the wireless local area mesh network. The data packets are forwarded from the source node to the destination node by the intermediate nodes based on the routing tables along the path. To maintain the valid routes and to avoid the routing loops due to the link/node failure and network topology changes, each node not only periodically transmits route updates but also broadcasts the updates immediately when significant new information is available. Although the DSDV permits packets to be forwarded using either layer-2 MAC addresses or layer-3 IP addresses and there is no route discovery delay, it incurs a relative high routing overhead because of network-wide routing message broadcasts. Especially when the nodes in a network move quite fast and the network topology changes frequently, a large portion of network capacity is used to keep the routing information current. In addition, some nodes may not forward the data packets originated from other nodes due to processing and battery limitation or other reasons. However, the above protocols assume that each node agrees to relay data packets to other nodes upon request and does not consider the non-forwarding nodes.

In a wireless local area mesh network, two or more nodes are interconnected via IEEE 802.11 links. Each node has a unique IEEE 802.11 Media Access Control (MAC) address. When a source node sends data packets to a destination node, it needs to know the path/route from the source node to the destination node.

What is needed is a routing mechanism to discover and establish the path based on the destination MAC address. The problem solved by the present invention is how a source node discovers and establishes the path to the destination node based on the destination's IEEE 802.11 MAC address in a wireless local area mesh network.

SUMMARY OF THE INVENTION

A wireless LAN (WLAN) mesh network consists of two or more nodes interconnected via IEEE 802.11 links. Each node would participate in a routing protocol for automatic topology learning and path selection. The present invention provides a mechanism for discovering the route based on the IEEE 802.11 Media Access Control (MAC) address. It simultaneously supports the on-demand route discovery and proactive route establishment. The mechanism can discover and establish the route to satisfy the quality of service (QoS) requirements for real-time multimedia applications and maintain such a route. In addition, the mechanism supports the non-forwarding nodes.

A method for selecting a route by a node between the source node and a destination node in a wireless mesh network by establishing the route between the source node and the destination node using media access control addresses is described. A method for a node to select a route to join a multicast group in a wireless mesh network by establishing the route between the said node and the multicast group using media access control addresses is also described. In both cases the routes established can be established using on-demand routing or proactive routing. While the invention described herein is described in terms of a wireless local area mesh network, the network within which the routes are established is not limited to a wireless local area mesh network but may be any form of wireless mesh network. An access point with proxy may join the wireless mesh network. Stations are associated with the access point but the stations are not members of the wireless mesh network so communications with the stations takes place through the access point and is transparent to the associated stations.

BRIEF DESCRIPTION OF THE DRAWINGS

The present invention is best understood from the following detailed description when read in conjunction with the accompanying drawings. The drawings include the following figures briefly described below.

DETAILED DESCRIPTION OF THE PREFERRED EMBODIMENTS

The present invention performs routing functions at layer 2 so that the packets can be transmitted and forwarded from the source node to the destination node based on their IEEE 802.11 MAC addresses. It supports on-demand routing and proactive routing simultaneously. Furthermore, some nodes may only send or receive data, but do not forward data originated from the other nodes due to processing and battery limitation or other reasons. The present invention can handle these non-forwarding nodes. The routing mechanism of the present invention may be used for client-server application configurations/topologies, peer-to-peer application configurations/topologies and hybrid application configurations/topologies.

Hybrid mesh on-demand routing is based on Route Request and Route Reply messages, which is similar to the IP layer routing protocol AODV. For hybrid mesh on-demand routing at layer 2, when a source node wants to send a packet to some destination node, it checks its routing table for a route. If there is a valid route, it forwards the packet to the next hop specified in the routing table for this destination node. If there is no valid route, it initiates a route discovery by broadcasting a Route Request (RREQ) message. Different from the AODV, the RREQ message contains the originator IEEE 802.11 MAC address (not the IP address) with its sequence number and optional layer 3 information as well as the destination node MAC address (not the IP address) with the last known destination sequence number and optional layer 3 information for this destination node. It also contains the message ID, the route metric, the time-to-live (TTL) and the route lifetime. Immediately before a node initiates a route request, it increments its own sequence number.

By broadcasting the RREQ message or other mesh routing control messages such as the RANN message described below, the IEEE 802.11 broadcast MAC address can used as the destination address of the transmitted mesh routing control message. An alternative approach is to assign a dedicated IEEE 802.11 multicast MAC address for flooding the mesh routing control messages (mesh routing control group address). This address specifies all the mesh nodes. The mesh nodes receive the messages destined for this mesh routing control group address. Non-mesh nodes may not receive the messages destined for this mesh routing control group address.

Figure 1:
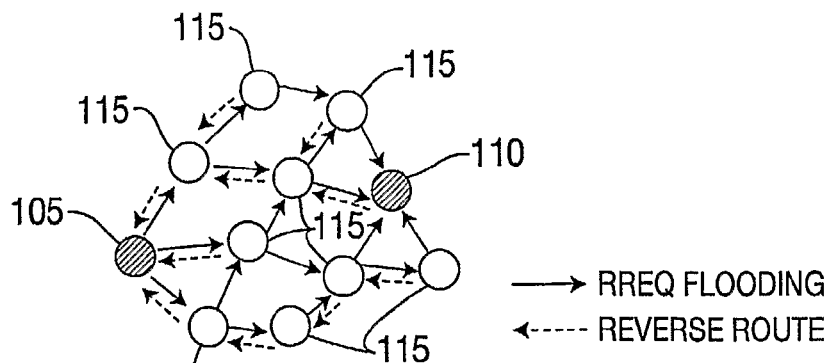
FIG. 1 depicts a wireless local area mesh network showing the flooding of the mesh network with the Route Request (RREQ) message and the reverse path establishment.

Referring to FIG. 1, which depicts a wireless local area mesh network, node 105 is a source node and node 110 is a destination node. All other nodes 115 are potential/possible intermediate nodes, which are nodes through which messages/packets/data may pass between the source node 105 and the destination node 110. The set of intermediate nodes 115 for transmitting a particular unit of content from a source node to a destination node is determined based on the route/path selected. Source node 105 and destination node 110 are textured/shaded to differentiate them from potential/possible intermediate nodes 115. It should be noted that in another instance what are currently (in FIG. 1) source and destination nodes may be intermediate nodes in the instance that other nodes become source and destination nodes. In FIG. 1, source node 105 floods the wireless local area mesh network with Route Request (RREQ) messages. A reverse path is established based on the Route Request messages.

Once a node receives a RREQ message, it checks the originator address and message ID to see if it has seen this RREQ message before. If this is the first RREQ message, the node updates the metric field by adding the link cost between the node from which it received RREQ message and itself and then establishes a reverse route to this originator in its routing table. If the node is the destination node or if the node has an unexpired valid route to the destination and the sequence number for that destination is at least as great as that indicated in the RREQ message, it responds by unicasting a Route Reply (RREP) message back to the originator. Otherwise, the node propagates the RREQ message with the new metric. If this is not the first RREQ message, it updates the metric field to the originator by adding the link cost between the node from which it received RREQ message and itself. The node updates the reverse route if the new metric is less than the metric recorded in its routing table. Otherwise it discards the RREQ message. The node replies with an RREP message to the originator if it meets the requirements as described above. Otherwise it propagates the RREQ message with the new reverse route metric. The reverse path/route is used for sending the RREP message back to the originator of the RREQ message to establish the forward path and also for bi-directional communications between the source node and the destination node.

The RREP message is sent back to the originator of the RREQ message by unicast to establish the forward path. It contains the originator MAC address, the destination MAC address and optional destination layer 3 information, the sequence number for the destination, the metric, the time-to-live and the route lifetime. If the destination node responds, it uses the maximum of its current sequence number and the destination sequence number in the RREQ message. The initial value of the metric is zero. The destination also sets the lifetime of the route. If the intermediate node responds, it uses its record of the destination's sequence number and the metric, as well as the calculated route lifetime based on the route table entry.

Figure 2:
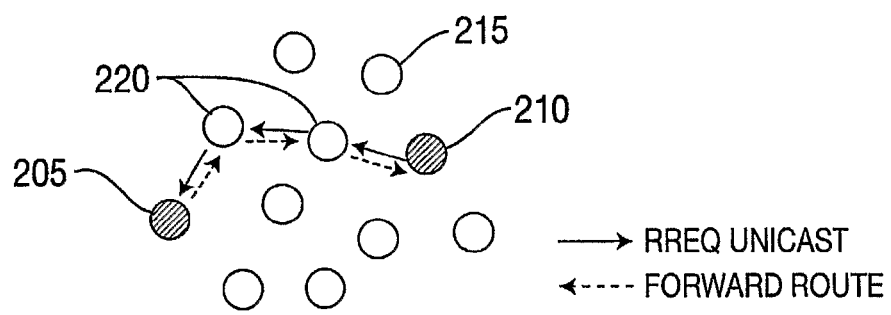
FIG. 2 depicts a wireless local area mesh network showing the unicast of the Route Reply (RREP) message and forward path establishment.

Referring to FIG. 2, which depicts a wireless local area mesh network, node 205 is a source node and node 210 is a destination node. A set of intermediate nodes 220 for a particular source node 205 and destination node 210 has been determined. Intermediate nodes 215 are no longer intermediate nodes for the route/path between source node 205 and destination node 210. The forward path is established by the unicast RREP message from destination node 210 to source node 205.

The RREP message is unicast through the reverse route established during the route request broadcast. When an intermediate node receives the RREP message, it updates the metric by adding the link cost between the node from which it received the RREP message and itself. It sets up a forward path in its routing table and forwards the RREP message to the originator of the RREQ message. If a node receives more than one RREP message, it forwards the first RREP message. It updates the routing table and forwards the new RREP message only if the new RREP message contains a greater destination sequence number or the same destination number with a better metric. Otherwise it discards the new RREP message. FIGS. 1 and 2 show the RREQ messages flooding the mesh network and the forward path establishment by unicasting RREP messages. The originator can commence data/packet transmission as soon as the first RREP message is received and can update its routing information later if a better route is discovered.

A node may have multiple IEEE 802.11 wireless interfaces. The node has a unique node identifier, i.e. a node IEEE 802.11 MAC address, and each interface also has its own IEEE 802.11 MAC address. The node MAC address is used in the RREQ and RREP messages as well as the other routing control messages described below. When a multi-interface node broadcasts the RREQ message, it may broadcast the RREQ message on all its interfaces. When a multi-interface node responds to a RREQ message by unicasting a RREP message, it sends the RREP message to the interface on which it received the corresponding RREQ message.

The routing table includes an entry for a destination node. Each entry contains the destination MAC address and its optional layer 3 information (supported layer 3 protocol and address, e.g. the IP address of destination node), the destination sequence number, the next hop MAC address and the interface to reach the next hop, a list of the upstream nodes and interfaces using this route, the state and routing flags (e.g. valid, invalid), the metric to the destination, and the route lifetime. The route lifetime is updated each time it is used. The route becomes invalid if it is not used within the route lifetime. The invalid route will be deleted after its deletion timer expires. The originator can start data transmission as soon as the first RREP message is received and can later update its routing information if a better route is discovered. When an intermediate node receives a data packet, it checks its routing table based on the destination MAC address. If there is a valid entry for this destination, it forwards the packet to the next hop specified in this routing entry. This process continues until the destination node is reached.

Figure 3A:
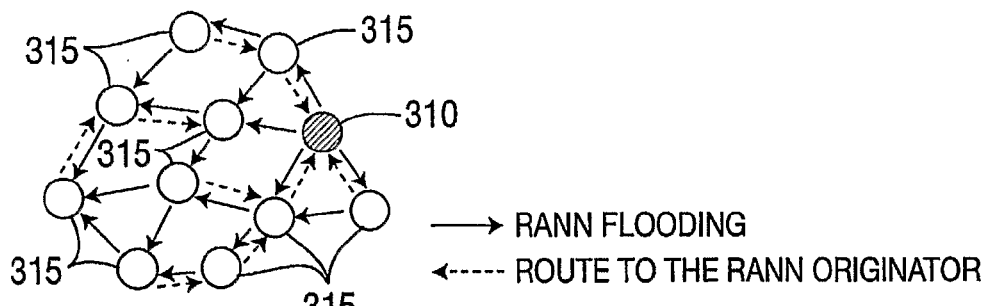
FIG. 3A depicts a wireless local area mesh network showing the flooding of the Route Announcement (RANN) message for proactive establishment of the route to the RANN message originator.

In the on-demand routing, only currently used routes are maintained. This reduces the routing overhead. However it results in extra delay because the source node must establish the route before it can send the data. The source node also needs to buffer the data during the route discovery period. To reduce the route discovery delay, proactive routing can be used. Furthermore, in the case of many nodes communicating with a special node, significant control traffic may be required if each of these nodes individually discovers the route to this special node. For example, many nodes in a mesh network access the Internet or other networks through one or more portal node that connects the mesh network to the Internet or other networks. It is desirable that the portal node proactively announces the routes to it in the mesh network. The present invention integrates the on-demand route discovery and proactive route announcement. A node can be explicitly configured by the network administrator or implicitly determines according to certain policies, to perform proactive routing in the mesh network. For example, one policy is that all the mesh portal nodes shall perform the proactive route announcement. Referring to FIG. 3A, node 310 advertises itself by periodically broadcasting an unsolicited Route Announcement (RANN) message so that other nodes 315 in the mesh network can learn the route to the RANN message originator 310. That is, the node that originates the RANN message floods the wireless local area mesh network with unsolicited RANN messages in order to proactively establish routes to itself. When a multi-interface node broadcasts the RANN message, it may broadcast the RANN message on all its interfaces. The RANN message contains the IEEE 802.11 MAC address of the originator node (not the IP address) with its destination sequence number and optional layer 3 information. It also contains the route metric, the time-to-live and the route lifetime. Note that different from the RREQ message, the destination address in the RANN message is the MAC address of the RANN message originator because it is used to establish the routes to the RANN message originator proactively in the mesh network.

When node 315 receives a RANN message, it updates the metric field to the originator of the RANN message by adding the link cost between the node from which it received the RANN message and itself. If the node does not have a valid route to this destination node (i.e. the RANN message originator 310) in its routing table, it creates the route to this destination node in its routing table. The node broadcasts the RANN message with the new metric to its neighbors on one or more of its interfaces. When it has a valid route to this destination, the node updates its routing table and broadcasts the RANN message with the new metric to its neighbors only if the RANN message contains a greater destination sequence number or the same destination sequence number with a better metric. Otherwise it discards the RANN message. In this way, the routes to the RANN message originator are established in the mesh network.

Figure 3B:
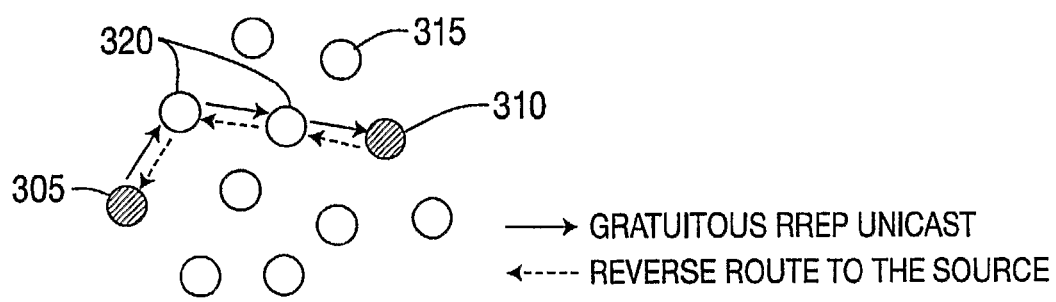
FIG. 3B depicts a wireless local area mesh network showing that a source node sends a gratuitous RREP message to establish a reverse route to it.

Referring to FIG. 3B, when a source node 305 wants to send data packets to a destination node 310, it may already have a forward path to this destination node 310 obtained from the destination node's route announcement. In this instance, it can transmit the packet immediately. However it is possible that there is no reverse route from destination node 310 to source node 305. If bi-directional communications are needed, source node 305 can send a gratuitous RREP message in unicast to destination node 310 through intermediate nodes 320 along the forward path established by the destination node's 310 RANN message. The RREP message establishes a reverse route to source node 305.

Some nodes want to join the wireless local area mesh network only as the source node or destination node, i.e. not forwarding the traffic originated from other nodes. A node can be configured as a non-forwarding node by the administrator or is determined to be a non-forwarding node based on certain policies. For example, one such policy is that if the energy in the battery of the node is less than a threshold, the node will become a non-forwarding node. A non-forwarding mesh node sends the RREQ message when it wants to transmit packets. It replies to the route request message only if it is the destination node in the received RREQ message. The non-forwarding node does not reply to the route discover message (RREQ) if it is not the destination node in the RREQ message. It receives the RANN message to learn to the route to the originator of the RANN message. It sends the RANN message so the route destined for it can be proactively established. However, the non-forwarding mesh node does not forward any routing control messages, including RREQ, RREP, and RANN messages, to its neighbors. By so doing, there is no route using it as an intermediate node.

If a link breaks, the Route Error (RERR) message is sent to the affected source nodes of the active paths. The upstream node of the broken link, i.e. the node near the source, initiates the RERR message. Before sending the RERR message, it also marks the damaged routes invalid, sets the metric of the damaged routes to infinite, and increments the destination sequence numbers of the unreachable destinations due to this link failure in the routing table. The RERR message contains a list of all the unreachable destinations due to this link failure and their incremented sequence numbers. It broadcasts the RERR message to its one or more upstream neighbors. For a multi-interface node, it sends the RERR message on the interfaces with the routes using this failed link. When a neighbor receives a RERR message from its downstream node, it checks whether it has a route to use this downstream neighbor to the listed destinations. If so, it marks these routes as invalid and sets the metric of these routes to infinite. It then propagates the RERR message to its upstream nodes. When a source node receives the RERR message, it re-initiates the route discovery. If a node receives a data packet with a destination MAC address that does not have an active/valid route, the node creates a RERR message for the destination node and sends the RERR message to its upstream neighbors.

Local connectivity management is accomplished by the nodes periodically sending beacons (HELLO messages) to their neighbors. A node receiving a beacon from a neighbor, updates the route lifetime associated with that neighbor in its routing table. If a node fails to receive a beacon from a neighbor for a given Hello_life then the link to that neighbor is broken and the routing information for this neighbor is updated in its routing table.

Figure 4:
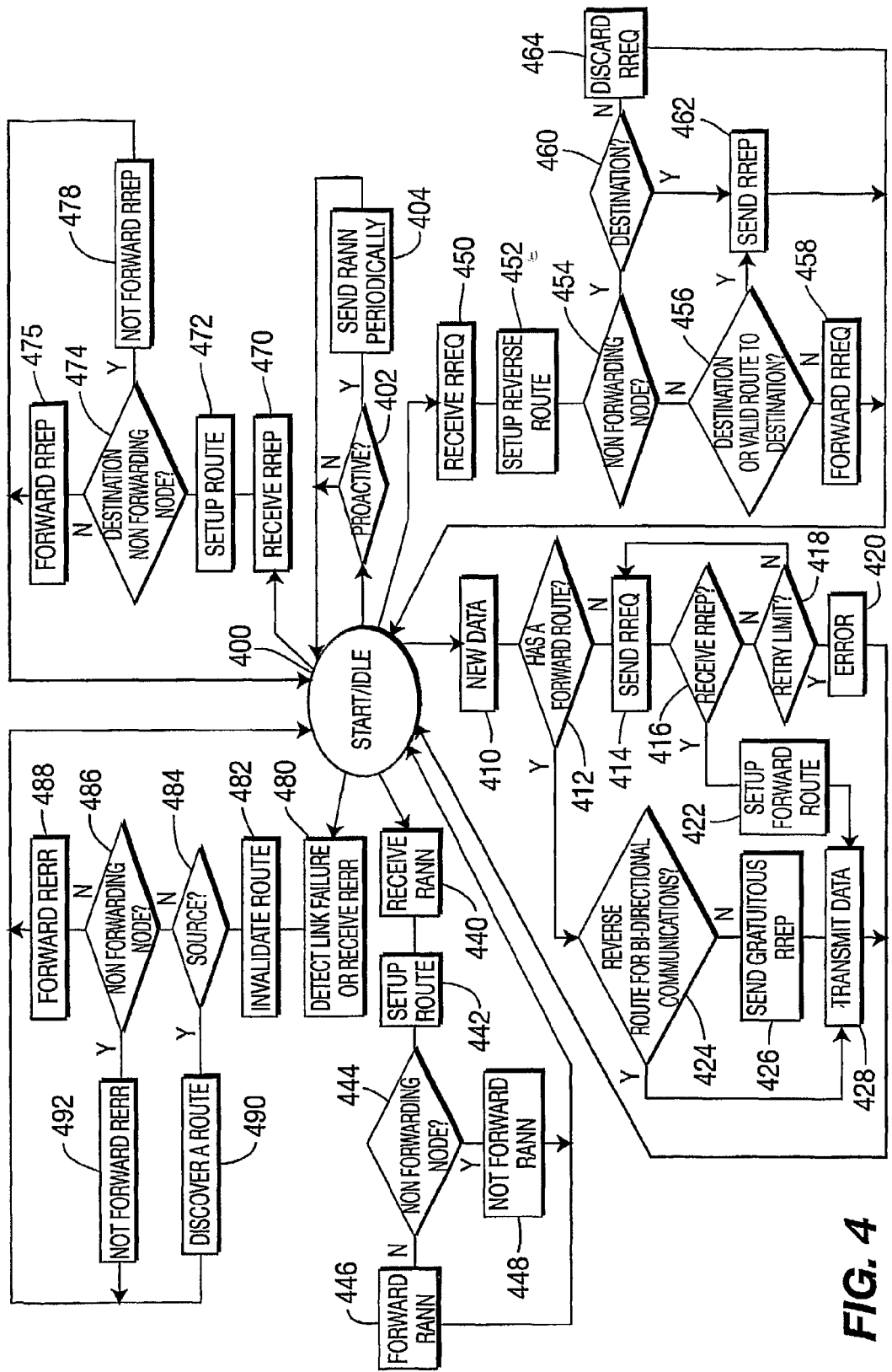
FIG. 4 is a diagram illustrating the methods that a node establishes the routes on-demand proactively, and processes the routing control messages in accordance with the principles of the present invention.

FIG. 4 is a diagram illustrating the method whereby a node establishes the routes on-demand and proactively, and processes the routing control messages in accordance with the principles of the present invention. At step 402, a node determines if the proactive route discovery is required. This information can be explicitly configured by the network administrator or implicitly obtained through certain policies as described above. If the proactive route discovery is needed, the RANN messages are sent periodically at step 404. If the proactive routing is not required, the node returns to the idle state. At step 410, when a node receives new data packets from its upper layer application, it checks whether it has a forward path/route to the destination (step 412). If not, it initiates the on-demand route discovery by sending the RREQ message (step 414). It waits for the corresponding RREP message. Once the RREP message is received (step 416), it sets up the forward route (step 422) and starts transmitting data (step 428). The source may be allowed to retransmit the RREQ message for a configured number of times if the RREQ message is lost (step 418). If it still not received the RREP message after the maximum number of retransmissions of the RREQ message, it notices the application that the destination node is unreachable (step 420) via an error message. If the source node has a forward route, it checks whether it has a reverse route for bi-directional communications (step 424). It is possible that there is no reverse route if the forward route is established by the RANN advertisement of the destination node. In the case of unidirectional communications or bi-directional communications where the reverse route available, the source node transmits the data immediately at step 428. In the case of bi-directional communications with no reverse route, the source node sends a gratuitous RREP message (step 426) for establishing the reverse route. The source node can transmit the data (step 428) as soon as the gratuitous RREP message is sent.

At step 440, when a node in the mesh network receives a RANN message, it sets-up/establishes/refreshes the route to the originator of the RANN message (step 442). If it is a non-forwarding node (step 444), it does not forward the RANN message (step 448). If it is a forwarding node, it forwards the RANN message (step 446). When a node receives a RREQ message at step 450, it sets-up/creates/refreshes the reverse route (step 452). A node determines whether it is a non-forwarding node (step 454). A non-forwarding node replies to the RREQ message by sending the RREP message in unicast back to originator of the RREQ message (step 462) only if it is the destination node (step 460) specified in the RREQ message. A non-forwarding node does not forward the RREQ message (step 464) if it is not the destination node but rather discards the RREQ message. For a forwarding node, if the node is the destination node or if the node has a valid route to the destination (step 456), it responds by unicasting a Route Reply (RREP) message back to the originator of the RREQ message (step 462). Otherwise it propagates the RREQ message (step 458). When a node receives a RREP message at step 470, it sets-up/creates/refreshes the route (step 472). If it is a non-forwarding node or it is the destination node of this RREP message (step 474), it does not forward the RREP message (step 478). Otherwise, it forwards the RREP message (step 476). When a node detects a link failure or when a node receives a RERR message at step 480, it inactivates the damaged route (step 482). If it is the source node (step 484), it discovers/learns a new route (step 490). Otherwise, it forwards the RERR message (step 488) if it is not a non-forwarding node (step 486). It does not forward the RERR message (step 492) if it is a non-forwarding node.

Multiple stations may associate with an access point (AP) in a WLAN. Referring FIG. 5, node 505 is an AP, which joins the mesh network. However the stations 510 are not part of the wireless local area mesh network 525. The stations 510 form an infrastructure-based network/sub-network with access point 505. The mesh AP 505 acts as a proxy of these stations 510 and routing is transparent to the non-mesh stations 510. The mesh AP 505 discovers the route to the destination when it forwards data packets originated by an associated station 510. It also responds to a RREQ message for its associated stations by unicasting a RREP message to the RREQ message originator. The mesh AP 505 announces the route to its associated stations 510 by broadcasting the RANN message. Multiple destination addresses with their individual sequence numbers, optional layer 3 information, time-to-live (TTL), metric and route lifetime can be announced using a single RANN message. Each destination address corresponds to a station.

Figure 5:
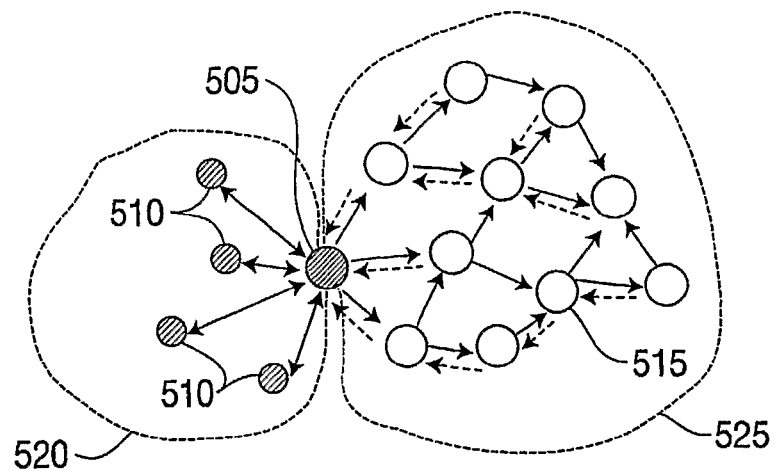
FIG. 5 depicts a wireless local area mesh access point with multiple associated stations.
Figure 6:
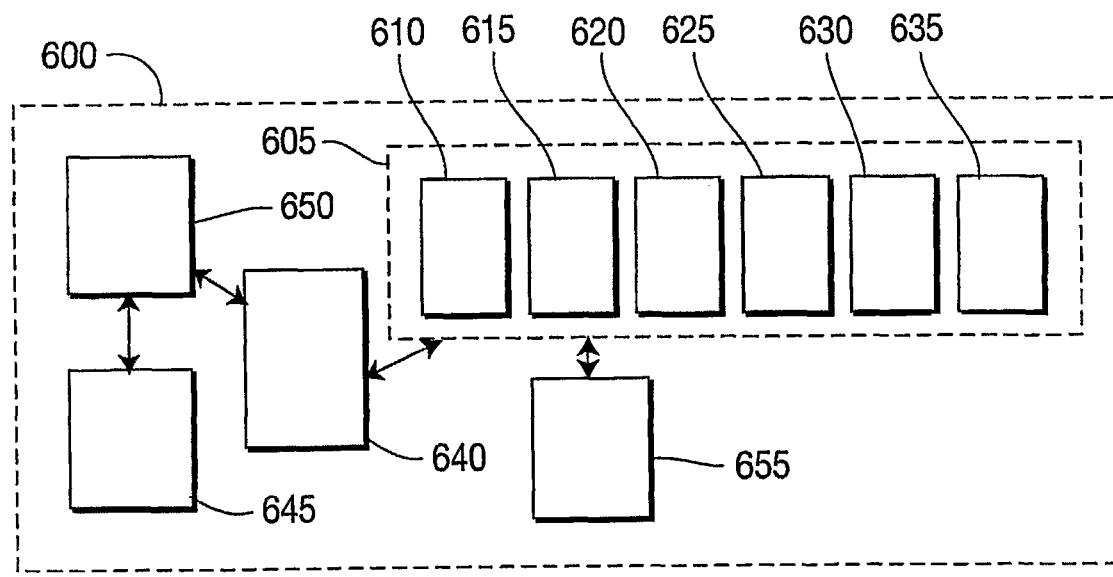
FIG. 6. is a schematic diagram illustrating a wireless local area mesh access point in accordance with the present invention.

FIG. 6 is a block diagram illustrating the details of a mesh access point with proxy 600 (node/AP 505 in FIG. 5). The mesh AP with proxy 600 has two logical interfaces. One station transmit/receive (TX/RX) interface module 645, which communicates with the associated stations and the mesh network transmit/receive (TX/RX) interface module 655, which communicates with the mesh network. These two logical interfaces may be implemented with two physical IEEE 802.11 wireless interfaces operating on different channels (each physical interface corresponding to a logical interface) or with a single physical IEEE 802.11 wireless interface. The station association control module 650 performs the station association control. The mesh routing module 605 is responsible for routing the data in the mesh network. The mesh routing module 605 includes a mesh route discovery unit 610 that sends the route request to discover the route to a destination node in the wireless local area mesh network (performing on-demand routing). It also includes a mesh route announcement unit 615 that sends the RANN message in the mesh network (performing proactive routing). A routing message processing unit 620 processes the received routing control messages and replies to/forwards the routing control messages. A route maintenance unit 625 maintains the route and generates the route error message if the link break is detected. The mesh routing module 605 also maintains a routing table 630 in its cache. A data processing unit 635 sends/receives/forwards the data packets based on the routing table. The mesh routing module 605 interfaces with the mesh network via the mesh network TX/RX interface module 655. The station proxy 640 bridges the associated stations and the mesh network. It passes the associated station information from the association control module 650 to the routing module 605. It interacts with the routing module 605 to perform routing and data forwarding functions for the associated stations (e.g. discovering the route to the destination when it forwards data packets originated by an associated station, responding to a RREQ message for its associated stations, and announcing the route to its associated stations by initiating the RANN message in the mesh network).

The present invention supports both multicast and unicast routing. A separate multicast routing table is maintained by a node. Multicast on-demand route discovery is based on Route Request and Route Reply messages, similar to the unicast on-demand route discovery described above, which is also similar to the IP layer routing protocol AODV. A node can dynamically join or leave a multicast group at any time. Each multicast group has a multicast group leader. The group leader maintains the multicast group sequence number. Upon detecting the failure of the multicast group leader a new group leader is created so that there is no central point of failure.

When a node wants to join a multicast group, the node broadcasts a RREQ message to all mesh nodes. The RREQ message includes the originator's MAC address, its current sequence number, its optional layer 3 information (supporting layer 3 protocol and address, e.g. IP address), the destination MAC address (i.e. multicast group address to be joined), the group's last known sequence number, the message ID, metric, time-to-live parameter and a join flag. Any member of the multicast tree may respond to the RREQ message but only members of the multicast tree may respond. A non-member node (not a member of the multicast tree) does not respond to the RREQ message, but creates a reverse route/path to the originator. The non-member node then forwards the RREQ message to its neighbors. The details describe below. The originator waits for the term of the discovery period to receive a reply or replies. If there is not reply then the originator retransmits/re-broadcasts the RREQ message with the message ID incremented by 1. The originator continues in this manner until it receives a reply or the retry limit has been exceeded. If no reply is received after the maximum number of retries, then the originator may become the multicast group leader for the new multicast group.

When a node receives a request to join a multicast group from another node (not in the group), it updates the metric field and adds an inactive entry for the originator in its multicast routing table. Each entry in the multicast routing table has a flag indicating whether a link is active or inactive. No data/packets will be forwarded/transmitted over an inactive link for the multicast group. The node also creates a reverse route/path entry to the originator in its unicast routing table per unicast route establishment rules.

A multicast tree includes nodes that are members of the multicast group and forwarding nodes for the multicast group. A forwarding node is a node that is a member of the multicast tree but not a member of the multicast group. A forwarding node acts as a "pass-through" or "conduit" for the data/packets/content that it receives. It does not use the data/packets/content that it receives and has no interest in the data/packets/content that it receives. Any member of the multicast tree may reply to a RREQ message to join the multicast group, if its recorded sequence number is at least as great as that carried in the RREQ message. The multicast group leader always responds to a RREQ message to join the multicast group. The node responding to a RREQ message to join the multicast group sets up a unicast reverse route to the originator in its routing table per the unicast route establishment rules. The responding node also sets up a route for the originator in the multicast routing table. The route is flagged as inactive. The responding node then unicasts a RREP message back to the originator of the RREQ message. As a node along the reverse path receives the RREP message, it updates the metric and set up a forward path/route in its multicast routing table. The path/route set up in the multicast routing table is flagged as inactive. The node then forwards the RREP message to the next hop.

Each node in a multicast tree has a multicast routing table. A multicast routing table has entries for each multicast group. A multicast routing table entry includes the multicast group MAC address, the next hop MAC address, the interface to the next hop, the multicast group sequence number, the metric to the multicast group leader, flags (active/inactive and routing flags) and a route lifetime parameter. The route lifetime parameter is updated each time that a route/path is used/traversed. The route/path becomes invalid if it is not used within the specified route lifetime.

The originator of a RREQ message to join a multicast group may receive multiple RREP messages from different members of the multicast tree. Each reply represents a potential route/path to the multicast group. The originator tracks the replies received and waits for the expiration of the route discovery period/interval. The originator then selects a route having the greatest multicast group sequence number and the best metric to the multicast group. The originator activates the selected route/path at the expiration of the route discover period/interval by unicasting a multicast activation (MACT) message with the join flag set to join to its next hop. The originator sets the active/inactive flag to active for the selected route/path in its multicast routing table. As each hop along the path receives the MACT message, it activates the route in its multicast routing table and forwards it to its next hop if it is not the originator of the RREP message. This continues until the originator of the RREP message receives the MACT message. It should be noted that it is possible that a node is a member of two multicast groups/trees concurrently/simultaneously.

Figure 7A:
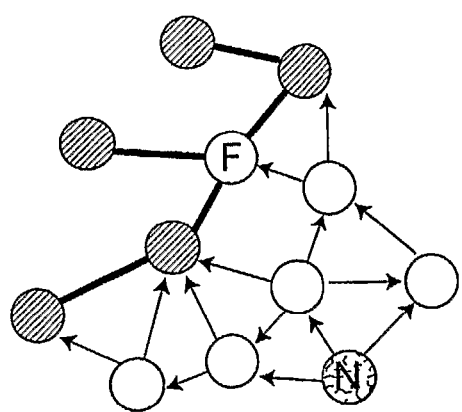
FIG. 7A illustrates a new node flooding the mesh network with route request (RREQ) messages requesting that it join the multicast group.
Figure 7B:
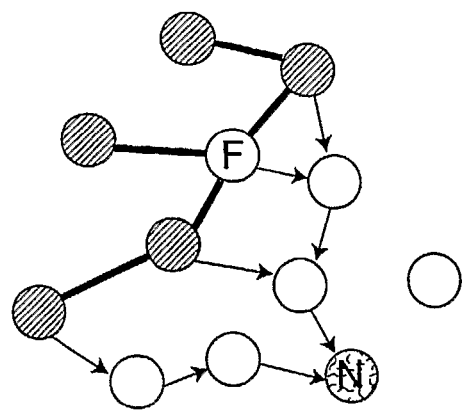
FIG. 7B depicts the route reply (RREP) messages that are sent back to the originator of the route request (RREQ) message by different multicast tree members.
Figure 7C:
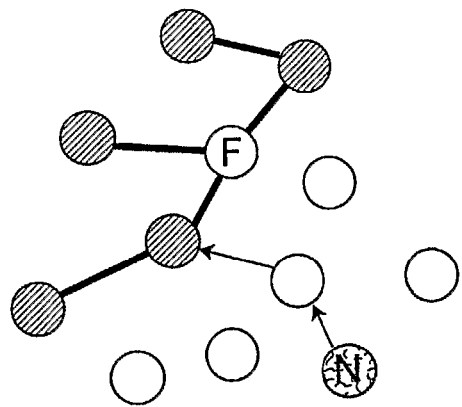
FIG. 7C shows the originator of the route request (RREQ) message transmitting a route activation message.
Figure 7D:
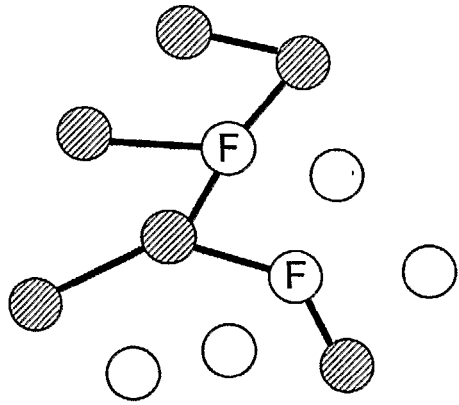
FIG. 7D shows the new node having been added to the multicast group.

FIGS. 7A-7D show how a new node "N" joins a multicast group. The dark shaded nodes are members of the multicast group and members of the multicast tree. The white nodes are nodes that are not members of the multicast tree or the multicast group. Node "N" is the new node that wants to join the multicast group. Shaded nodes that are marked with an "F" are forwarding nodes. Referring now to FIG. 7A, node "N" is a new node that wants to join the multicast group. Node "N" floods the mesh network with the RREQ messages in its attempt to join the multicast group. The RREQ messages are transmitted through nodes that are not members of the multicast tree until the RREQ messages reach nodes that are members of the multicast tree. FIG. 7B depicts the RREP messages that are returned to the new node wishing to join the multicast group. The RREP messages are sent back to the originator of the RREQ message along the reverse path by different multicast tree members. FIG. 7C shows the originator of the RREQ message transmitting a route activation message (MACT). The originator of the RREQ message unicasts the MACT message with the join flag set to activate the route/path to the multicast group. FIG. 7D shows the new node having been added to the multicast group. A node that was not a member of the multicast group or the multicast tree has been added as a forwarding node and thus, has become a member of the multicast tree.

If a node that is a member of the multicast group wishes to exit/depart from the group, then it unicasts a MACT message to its next hop with the prune flag set to prune and deletes the entry to the multicast group in its multicast routing table. Once the next node along the path receives the MACT message with the prune flag set to prune, it deletes the routing information for the node that transmitted the MACT message to it. If the node receiving the MACT message with the prune flag set to prune is not a member of the multicast group, and with the deletion of the node desiring to relinquish its membership in the multicast group becomes a leaf node, then it prunes itself from the multicast tree. The leaf node prunes itself from the multicast tree by unicasting a MACT message with the prune flag set to prune to its next hop. If the node receiving the MACT message with the prune flag set to prune is a member of the multicast group or is not a leaf node then it does not prune itself.

Figure 8A:
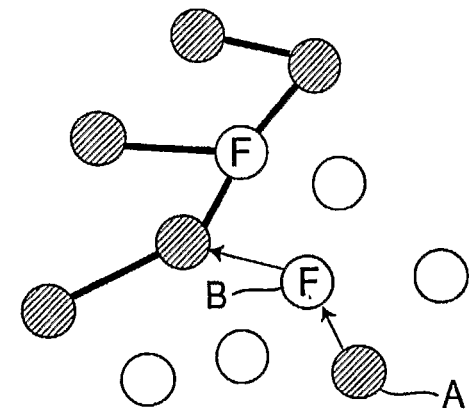
FIG. 8A illustrates how a multicast leaf node exits/departs a multicast group.
Figure 8B:
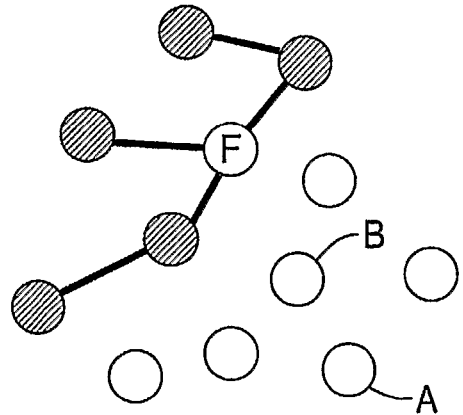
FIG. 8B shows the multicast tree after pruning.

FIGS. 8A-8B show how a node "A" relinquishes its membership in a multicast tree and group. The dark shaded nodes are members of the multicast group and members of the multicast tree. The white nodes are nodes that are not members of the multicast tree or the multicast group. Shaded nodes that are marked with an "F" are forwarding nodes. FIG. 8A illustrates how a multicast leaf node exits/departs a multicast group. Node "A" unicasts a MACT message with the prune flag set to prune in order to relinquish its membership in the multicast group and tree. FIG. 8B shows the multicast tree after pruning. After node "A" relinquished its membership from the multicast group and tree, node "B" which was a forwarding node was left as a leaf node so it pruned itself from the multicast tree.

A node on the multicast tree must receive a transmission from each of its neighbors every Hello_interval. A transmission includes a multicast data packet, a RREQ message, a Hello_message, a beacon message or a group hello (GRPH) message. A GRPH message is sent periodically by the group leader along the multicast tree. If a node fails to receive any transmissions from a neighbor on the multicast tree for Hello_Life then the link to this neighbor is broken. When a link is broken, the node downstream of the break (i.e., the node farther from the multicast group leader) attempts to repair it. Actually, it is an attempt to bypass the broken link and generate an alternate path back into the multicast tree. The downstream node that is responsible for attempting to repair the broken link or bypass the broken link by discovering an alternate route sends a RREQ message to join the multicast group that includes an extension field indicating the sending node's metric from the group leader. Nodes responding to the RREQ message must be members of the multicast tree with a fresh enough sequence number (a sequence number that is at least as great as the multicast group sequence number carried in the RREQ message) and the metric to the multicast group leader must be better than the metric indicated in the RREQ message. At the expiration of the route discovery period/interval, the node that originated the RREQ message in an attempt to bypass the broken link, selects a route/path and unicasts a MACT message with the join flag set to join to its next hop to activate the newly discovered route. If it is not possible to repair the multicast tree by rejoining the tree through any branch then the downstream node responsible for bypassing the broken link becomes the new multicast group leader for a new multicast tree.

Figure 9A:
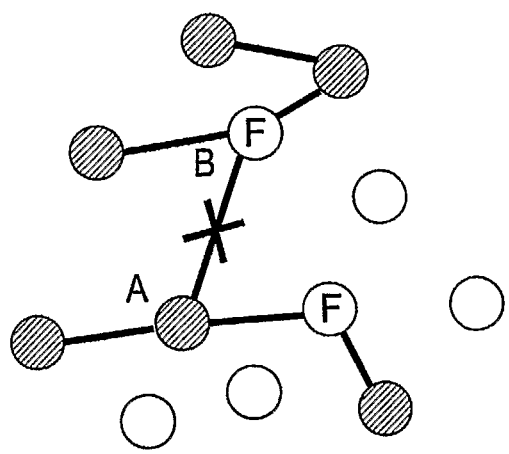
FIG. 9A illustrates a multicast tree with a broken link.
Figure 9B:
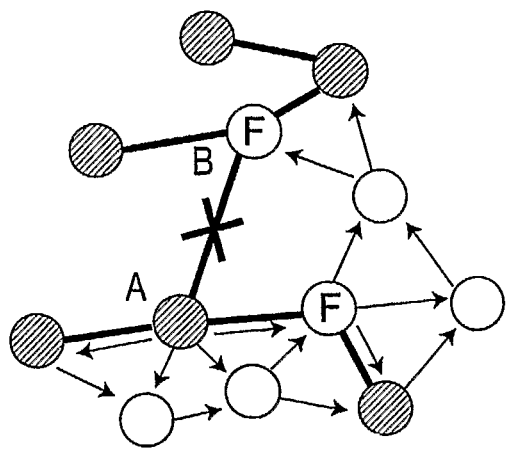
FIG. 9B depicts the downstream node attempting to bypass the broken link.
Figure 9C:
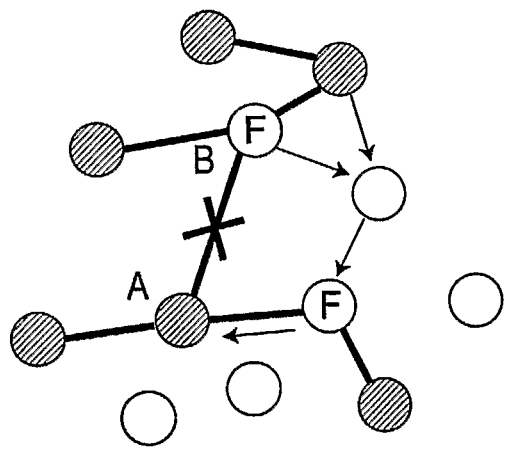
FIG. 9C shows the downstream node receiving route reply (RREP) messages from qualified multicast tree members.
Figure 9D:
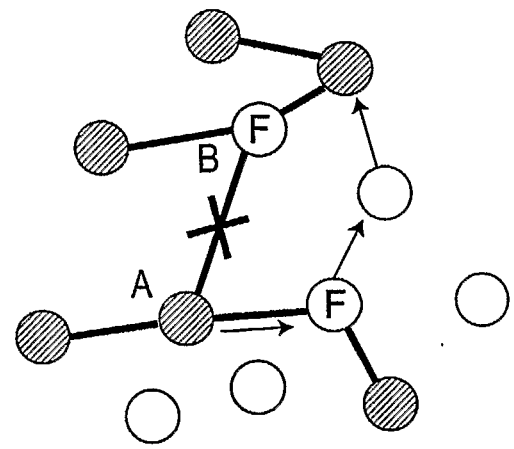
FIG. 9D shows the downstream node activating the new links.
Figure 9E:
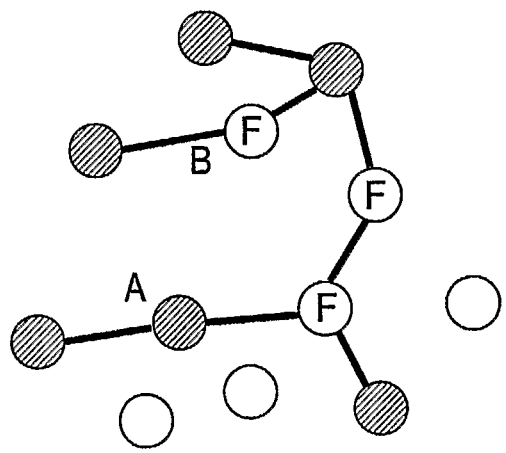
FIG. 9E depicts the new multicast tree that bypasses the broken link.

FIGS. 9A-9E illustrate bypassing a broken multicast tree link. FIG. 9A illustrates a multicast tree with a broken link. In this instance the link between node "A" and node "B" is broken. FIG. 9B depicts the downstream node (Node "A") attempting to bypass the broken link by sending out a RREQ message requesting to join the multicast group. FIG. 9C shows the downstream node (node "A") receiving RREP messages from qualified multicast tree members. FIG. 9D shows the downstream node (node "A") activating the new links with a MACT message with the join flag set to join. FIG. 9E depicts the repaired multicast tree with the broken link bypassed. As noted earlier the broken link is not actually repaired but rather is bypassed by using the available route discovery mechanisms.

Similar to the unicast, to reduce the route discovery delay, proactive routing is supported in the present invention. The present invention integrates the on-demand route discovery and proactive route announcement. For the multicast, a node can be explicitly configured by the network administrator or implicitly determines according to certain policies, to perform proactive routing in the mesh network if it is the multicast group leader. The configured group leader advertises the multicast group by periodically broadcasting an unsolicited Route Announcement (RANN) message so that other nodes in the mesh network can learn the route to the multicast group. The RANN message contains the IEEE 802.11 MAC address of the multicast group (not the IP address) with the group sequence number and optional layer 3 information. It also contains the route metric, the time-to-live and the route lifetime.

It is necessary to support the quality of service (QoS) in WLAN mesh networks, e.g. for multimedia and video applications. To support the QoS, the QoS requirements, for example, maximum delay and minimum bandwidth requirements for data can be carried in the optional fields of an extended RREQ message. To respond or forward a RREQ message with QoS extensions, a node must be able to satisfy the QoS constraints. Otherwise, it discards this QoS RREQ message. After the QoS route is established, if any node along the path detects that it no longer satisfies the requested QoS parameters, it sends a RERR message to the originator. The RERR message may also carry the currently measured QoS parameters such as available bandwidth and delay parameters for this link. The originator may decide to continue use this route with lower QoS or discover another route. For example, the RERR message indicates that the current bandwidth available on a link is equal to a value less than that requested by the originator before. The originator may reduce its source rate to meet the current available bandwidth or discover a new route with the originally required bandwidth.

It is to be understood that the present invention may be implemented in various forms of hardware, software, firmware, special purpose processors, or a combination thereof, for example, within a mobile terminal, access point, or a cellular network. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

What is claimed is:

1. A method for selecting a route between a source node and a destination node in a wireless mesh network, said method comprising establishing said route between said source node and said destination node, said selected route between said source node and said destination node being based on hybrid mesh on-demand and proactive mesh routing, wherein said hybrid mesh on-demand routing further comprises:
   receiving, by a node, a request message;
   if said receiving node is a non-forwarding node and said receiving node is not said destination node, then said request message is discarded;
   first determining, by said node, if said request message is a first request message from said source node;
   updating a metric in said request message and establishing a reverse route to said source node in a routing table of said node, responsive to said first determining act;
   second determining, by said node, one of a) if said node is said destination node and b) if said node has a valid unexpired route to said destination node in said routing table, if said node is not said destination node then said node is an intermediate node;
   first performing one of unicasting a reply message to said source node and propagating said request message with said updated metric if said node is said intermediate node;
   comparing a metric in said routing table with said updated metric responsive to said first determining act, and if said node is said intermediate node;
   updating said reverse route responsive to said comparing act; and
   second performing one of unicasting a route reply message to said source node and propagating said request message using said updated reverse route responsive to said second updating act.

2. The method according to claim 1, further comprising maintaining currently used routes in said wireless mesh network.

3. The method according to claim 1, further comprising maintaining information on all routes between said source node and said destination node using advertised route information.

4. The method according to claim 1, wherein said wireless mesh network is dynamic and any node is able to dynamically join or exit said wireless mesh network at any time.

5. The method according to claim 1, wherein said act of establishing said route further comprises:
   determining at least one route between said source node and said destination node in said wireless mesh network; and
   selecting one route between said source node and said destination node if a plurality of routes between said source node and said destination node are identified, wherein said selection is based on a sequence number and said updated metric.

6. The method according to claim 1, wherein said act of establishing said route further comprises advertising, by a configured node in said wireless mesh network, routes to reach it.

7. The method according to claim 1, further comprising periodically transmitting beacon messages by each node in said wireless mesh network to its neighbors in order to maintain local connectivity.

8. The method according to claim 1, further comprising permitting an access point to join said wireless mesh network, wherein at least one station is associated with said access point and further wherein said at least one station associated with said access point is not a member of said wireless mesh network and further wherein said access point acts as a proxy for said at least one station associated with said access point and routing between any station of said at least one station associated with said access point and any member of said wireless mesh network is transparent to said at least one station.

9. The method according to claim 1, further comprising supporting non-forwarding mesh nodes, wherein said non-forwarding mesh nodes are either source nodes or destination nodes.

10. The method according to claim 1, further comprising supporting quality of service by performing route establishment and maintenance based on quality of service requirements.

11. The method according to claim 1, in which said destination node is a member of a multicast group in said wireless mesh network.

12. The method according to claim 11, further comprising maintaining currently used routes in said wireless mesh network.

13. The method according to claim 11, further comprising maintaining information on all routes for said multicast group using advertised route information.

14. The method according to claim 11, wherein said multicast group of said wireless mesh network is dynamic and any node is able to dynamically join or exit said multicast group of said wireless mesh network at any time.

15. The method according to claim 11, wherein said act of establishing said route further comprises:
   determining at least one route between said node and said multicast group in said wireless mesh network; and
   selecting one route between said node and said multicast group if a plurality of routes between said node and said multicast group are identified, wherein said selection is based on a sequence number and said metric.

16. The method according to claim 11, wherein said act of establishing said route further comprises advertising, by a configured group leader, of said multicast group in said wireless mesh network, routes to reach it.

17. The method according to claim 11, further comprising periodically transmitting beacon messages by each node in said wireless mesh network to its neighbors in order to maintain local connectivity.

18. The method according to claim 11, further comprising supporting non-forwarding mesh nodes, wherein said non-forwarding mesh nodes are either source nodes or destination nodes.

19. The method according to claim 11, further comprising: supporting quality of service by performing route establishment and maintenance based on quality of service requirements.

20. The method according to claim 15, further comprising activating said selected route.

21. The method according to claim 11, further comprising bypassing a broken multicast tree link.

22. An access point with proxy comprising:
   a station proxy, which controls at least one station associated with said access point with proxy;
   a station association control module, which is in communication with said station proxy;
   a station interface module in communication with said station association control module, wherein said station interface module communicates with at least one station associated with said access point with proxy;
   a mesh routing unit in communication with said station proxy; and
   a mesh network interface module in communication with said mesh routing unit, wherein said mesh network interface module communicates with a mesh network using addresses which are exclusively media access control addresses, and wherein said access point with proxy performs route discovery;
   said access point comprising means for receiving a request message;
   means for checking an originator address and message identification to determine if the access point has previously seen the request message;
   means for updating a metric field of said access point by adding the link cost between the node from which the request message originated and itself, and establishing a reverse route to the originator of the request;
   means for unicasting a reply message back to the originator of the request;
   means for propagating the request message with a new metric;
   means for updating the metric field to the originator of the request by adding a link cost between the originator of the request and itself;
   means for updating the reverse route; and
   means for propagating the request message with the new reverse route metric.

23. The access point with proxy according to claim 22, wherein said mesh routing unit further comprises:
   a mesh discovery unit;
   a mesh route announcement unit;
   a routing message processing unit;
   a route maintenance unit;
   a data processing unit; and
   a routing table.

24. The access point with proxy according to claim 22, wherein said station interface module is used for transmission and reception.

* * * * *